United States Patent
Lee et al.

(10) Patent No.: US 9,465,262 B2
(45) Date of Patent: Oct. 11, 2016

(54) DISPLAY PANEL AND DISPLAY DEVICE

(71) Applicant: InnoLux Corporation, Miao-Li County (TW)

(72) Inventors: Hsin-Yu Lee, Miao-Li County (TW); Ching-Che Yang, Miao-Li County (TW); Chen-Kuan Kao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 14/700,901

(22) Filed: Apr. 30, 2015

(65) Prior Publication Data
US 2015/0331289 A1 Nov. 19, 2015

(30) Foreign Application Priority Data
May 19, 2014 (TW) .............................. 103117538 A

(51) Int. Cl.
*G02F 1/1343* (2006.01)
*G02F 1/1337* (2006.01)

(52) U.S. Cl.
CPC ... *G02F 1/134309* (2013.01); *G02F 1/133707* (2013.01)

(58) Field of Classification Search
CPC .................. G02F 1/134309; G02F 1/133707
See application file for complete search history.

(56) References Cited

U.S. PATENT DOCUMENTS

| | | | |
|---|---|---|---|
| 2013/0003004 A1* | 1/2013 | Shimizu | G02F 1/139 349/130 |
| 2014/0152934 A1* | 6/2014 | Huh | G02F 1/133707 349/43 |
| 2014/0152948 A1* | 6/2014 | Chae | G02F 1/133345 349/110 |
| 2015/0168751 A1* | 6/2015 | Lee | G02F 1/136227 349/41 |

* cited by examiner

*Primary Examiner* — Donald Raleigh
(74) *Attorney, Agent, or Firm* — Muncy, Geissler, Olds & Lowe, P.C.

(57) ABSTRACT

A display panel comprises a first substrate, a second substrate and a pixel array. The pixel array is disposed between the first substrate and the second substrate and comprises a pixel electrode and a data line. The data line is disposed adjacent to the pixel electrode and disposed above a side of the first substrate facing the second substrate. The pixel electrode comprises a first trunk electrode and a plurality of branch electrodes. An extension of the first trunk electrode along a first direction crosses the data line and the first trunk electrode connects to the branch electrodes. The branch electrodes extend along a second direction. An angle y is formed by the first direction and the second direction, x is the value of the ppi of the display panel, and x and y satisfy the following equations:

$A1 = -1.28 \times 10^{-5}(x)^3 + 0.0047722(x)^2 - 0.383068(x) + 59.494865,$ $B1 = -2.38 \times 10^{-5}(x)^3 + 0.0093751(x)^2 - 1.098394(x) + 81.919357,$ $B1 < y < A1,$ $45° < y \leq 70°.$

9 Claims, 5 Drawing Sheets

DISPLAY PANEL AND DISPLAY DEVICE

CROSS REFERENCE TO RELATED APPLICATIONS

This Non-provisional application claims priority under 35 U.S.C. §119(a) on Patent Application No(s). 103117538 filed in Taiwan, Republic of China on May 19, 2014, the entire contents of which are hereby incorporated by reference.

BACKGROUND OF THE INVENTION

1. Field of Invention

The invention relates to a display panel and a display device and, in particular, to a display panel and a display device having an enhanced transmittance.

2. Related Art

With the progress of technologies, flat display devices have been widely applied to various kinds of fields. Especially, liquid crystal display (LCD) devices, having advantages such as compact structure, low power consumption, less weight and less radiation, gradually take the place of cathode ray tube (CRT) display devices, and are widely applied to various electronic products, such as mobile phones, portable multimedia devices, notebooks, LCD TVs and LCD screens.

In the multi-domain vertical alignment (MVA) process for enhancing the quality of the TFT LCD, the polymer stabilized vertical alignment (PSVA) technology is a sufficiently mature technique to achieve the mass production and enhance the optical features such as aperture ratio and contrast. In the PSVA technology, photosensitive monomers are mixed with the liquid crystal during the one drop filling (ODF) process, and then an ultraviolet exposure is executed while an electric field is applied, so that the photosensitive monomers within the liquid crystal are cured. Consequently, the cured monomers are arranged according to the pattern of the pixel electrode of the TFT substrate so that the LC alignment can be achieved by the photocured monomers.

For the same illuminance, a display panel with a higher transmittance can save more power for the display device. Therefore, the industry strives to increase the transmittance of the display panel to save more energy and enhance the product competitiveness. In the conventional art, the pattern of the pixel electrode generally includes trunk electrode and branch electrode, and the included angle between the branch electrode and a horizontal direction is designed as 45 degrees, and thereby the average azimuthal angle (so-called ψ angle) of the liquid crystal molecules corresponding to the branch electrode can be controlled at 45 degrees so that they display panel can have a higher transmittance. However, with the higher resolution, i.e. higher ppi value, of the display panel and the smaller size of the pixel, the average azimuthal angle of the liquid crystal molecule will be affected by the electric field of the adjacent data line, common electrode and transparent electrode and thus can't be kept at 45 degrees anymore, and therefore the transmittance of the display panel will be reduced.

SUMMARY OF THE INVENTION

An objective of the invention is to provide a display panel and a display device having a higher transmittance to save more power and enhance the product competitiveness.

To achieve the above objective, a display panel according to this invention comprises a first substrate, a second substrate and a pixel array. The pixel array is disposed between the first substrate and the second substrate and comprises a pixel electrode and a data line. The data line is disposed adjacent to the pixel electrode and disposed above a side of the first substrate facing the second substrate. The pixel electrode comprises a first trunk electrode and a plurality of branch electrodes. An extension of the first trunk electrode along a first direction crosses the data line and the first trunk electrode connects to the branch electrodes. The branch electrodes extend along a second direction. An angle y is formed by the first direction and the second direction, x is the value of the ppi of the display panel, and x and y satisfy the following equations:

$$A1=-1.28\times10^{-5}(x)^3+0.0047722(x)^2-0.383068(x)+59.494865,$$

$$B1=-2.38\times10^{-5}(x)^3+0.0093751(x)^2-1.098394(x)+81.919357,$$

$$B1<y<A1,$$

$$45°<y\leq70°.$$

To achieve the above objective, a display device according to the invention includes a display panel. The display panel comprises a first substrate, a second substrate and a pixel array. The pixel array is disposed between the first substrate and the second substrate and comprises a pixel electrode and a data line. The data line is disposed adjacent to the pixel electrode and disposed above a side of the first substrate facing the second substrate. The pixel electrode comprises a first trunk electrode and a plurality of branch electrodes. An extension of the first trunk electrode along a first direction crosses the data line and the first trunk electrode connects to the branch electrodes. The branch electrodes extend along a second direction. An angle y is formed by the first direction and the second direction, x is the value of the ppi of the display panel, and x and y satisfy the following equations:

$$A1=-1.28\times10^{-5}(x)^3+0.0047722(x)^2-0.383068(x)+59.494865,$$

$$b1=-2.38\times10^{-5}(x)+0.0093751(x)^2-1.098394(x)+81.919357,$$

$$B1<y<A1,$$

$$45°<y\leq70°.$$

In one embodiment, y is further larger than 55° and less than or equal to 70°, B2<y<A2, and the equation of A2 is $A2=-1.44\times10^{-5}(x)^3+0.0054463(x)^2-0.487826(x)+62.778856$, and the equation of B2 is $B2=2.22\times10^{-5}(x)^3+0.008701(x)^2-0.993637(x)+78.635367$.

In one embodiment, at least one of the branch electrodes has a bent portion extending along a third direction, an angle z is formed by the third direction and the first direction, and the angle z is larger than 45° and less than or equal to 70°.

In one embodiment, at least one of the branch electrodes has a curved shape, an angle z is formed by at least a tangent line of the curved shape and the first direction, and the angle z is larger than 45° and less than or equal to 70°.

In one embodiment, z is larger than y, and the angle z is further larger than 55° and less than or equal to 70°.

As mentioned above, in the display panel and display device of the invention, the pixel electrode of the display panel includes a first trunk electrode and a plurality of branch electrodes, the extension of the first trunk electrode along a first direction crosses the data line and the first trunk electrode connects to the branch electrodes. Besides, the branch electrodes extend along a second direction and at least an angle y is formed by the first direction and the second direction. The equations are satisfied as follows:

$$A1=-1.28\times10^{-5}(x)^3+0.0047722(x)^2-0.383068(x)+59.494865$$

$$B1=-2.38\times10^{-5}(x)^3+0.0093751(x)^2-1.098394(x)+81.919357$$

$$B1<y<A1$$

$$45°<y\leq70°$$

x is the value of the ppi of the display panel.

Thereby, in comparison with the conventional art, when the angle y formed by the branch electrodes of the pixel electrode of the display panel and device and the first direction is between the above curves A1 and B1, and y is larger than 45° and less than or equal to 70°, the azimuthal angle of the liquid crystal is affected by the electric field of the data lines, common electrode and transparent electrode so that the average azimuthal angle of the corresponding liquid crystal molecules can approach 45°. In combination with the angle design of the transmittance axis of the polarizer, the whole transmittance of the display panel and device can be increased, and therefore the power can be saved and the product competitiveness can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
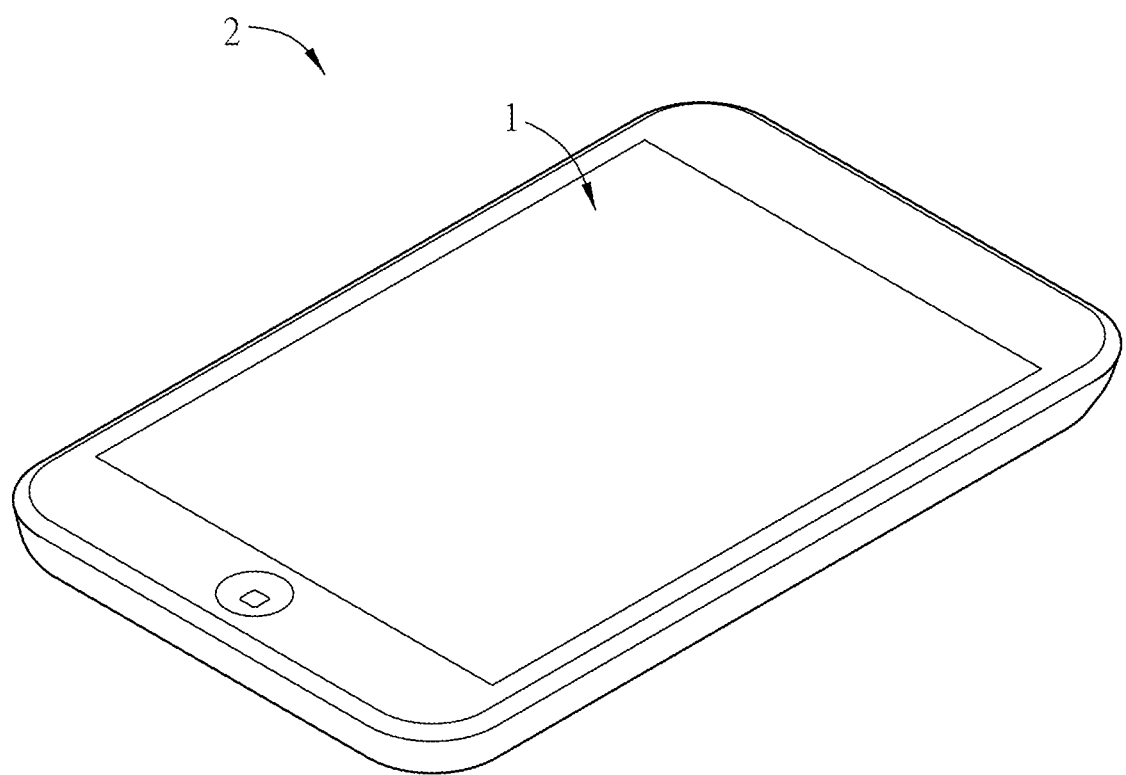
FIG. 1A is a schematic diagram of a display device of an embodiment of the invention.
Figure 1B:
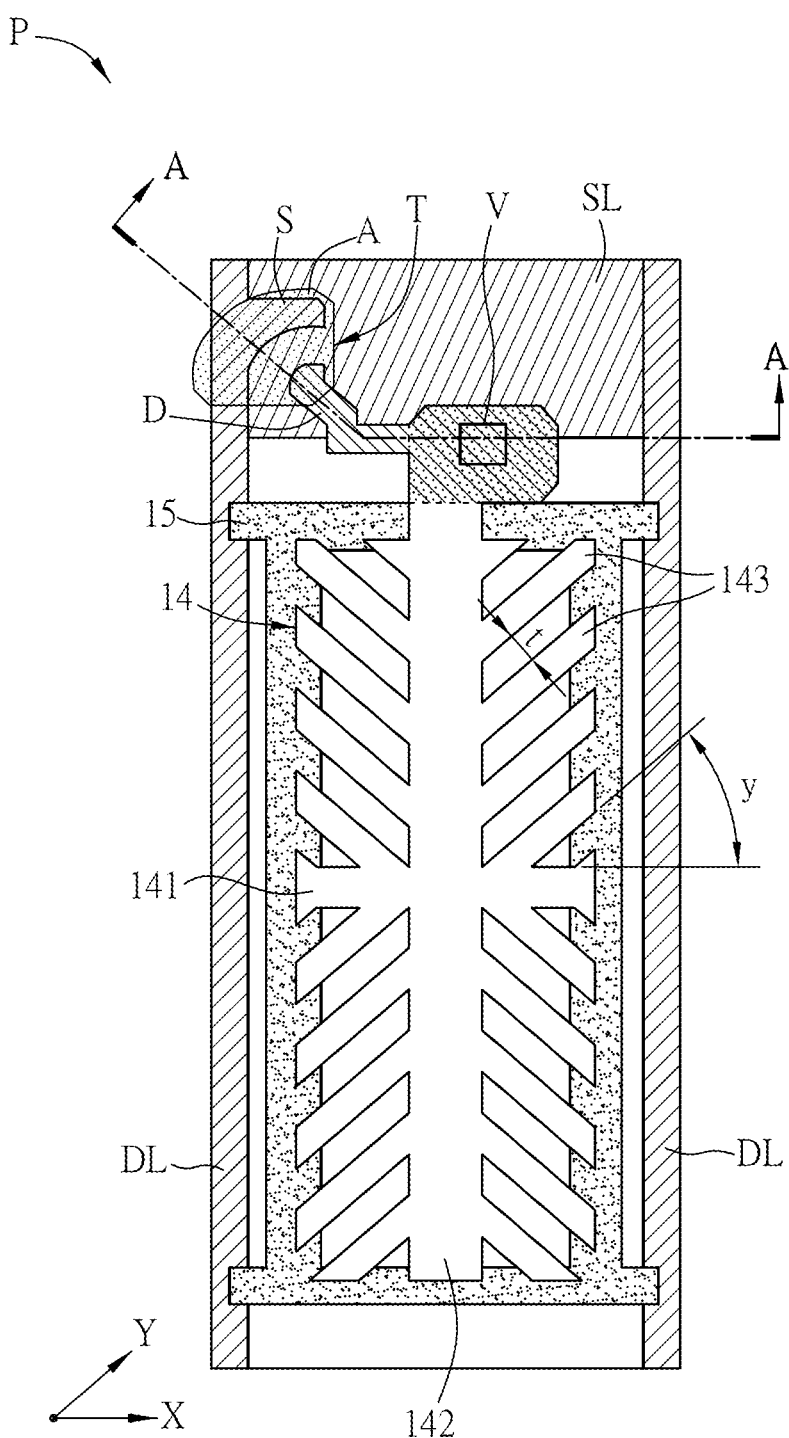
FIG. 1B is a schematic diagram of a pixel of the display panel of the display device in FIG. 1A.
Figure 1C:
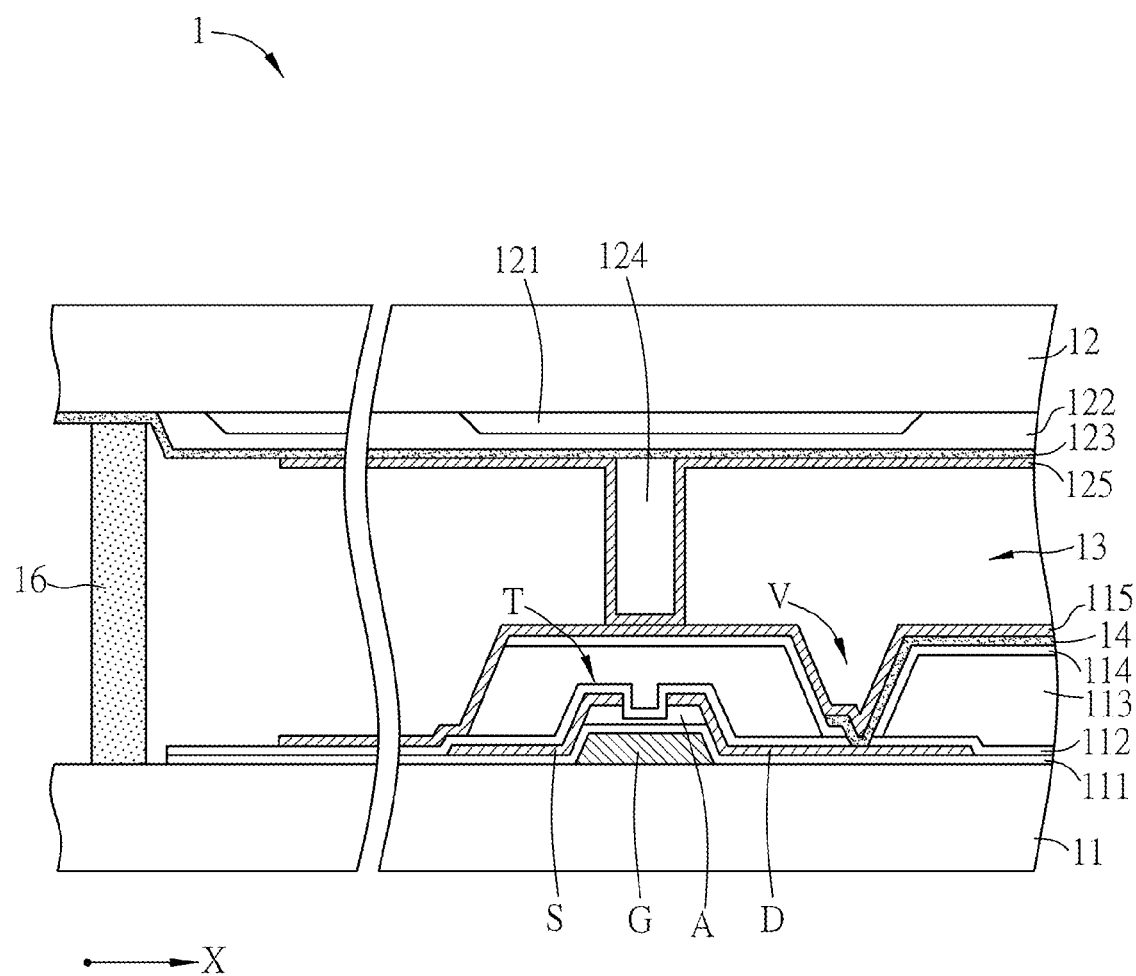
FIG. 1C is a schematic sectional diagram taken along the line A-A in FIG. 1B.

FIG. 1A is a schematic diagram of a display device 2 of an embodiment of the invention, FIG. 1B is a schematic diagram of a pixel P of the display panel 1 of the display device 2 in FIG. 1A, and FIG. 1C is a schematic sectional diagram taken along the line A-A in FIG. 1B. For the easier understanding, FIG. 1B just shows a scan line SL, two data lines DL, a thin film transistor (TFT) T, a pixel electrode 14 and a common electrode 15 of the display panel 1, without showing other elements. Moreover, although FIG. 1C is the schematic sectional diagram taken along the line A-A in FIG. 1B, FIG. 1C further shows the adhesive 16 of the display panel 1.

In this embodiment, the display device 2 is, for example but not limited to, a smart phone, and includes a display panel 1 and a backlight module (not shown). The display panel 1 is disposed opposite the backlight module. When the backlight module emits the light passing through the display panel 1, the pixels P of the display panel 1 can display colors to form images.

As shown in FIGS. 1A to 1C, the display panel 1 includes a first substrate 11, a second substrate 12 and a liquid crystal layer 13. The first substrate 11 and the second substrate 12 are disposed oppositely, and the liquid crystal layer 13 is disposed between the first substrate and the second substrate 11 and 12. Each of the first substrate 11 and the second substrate 12 can be made by a transparent material, and can be a glass substrate, a quartz substrate or a plastic substrate for example. The display panel 1 can further include a TFT array and a color filter (CF) array (not shown). The TFT array is disposed above the first substrate 11 and the CF array can be disposed above the first substrate 11 or the second substrate 12. The TFT array, the CF array and the liquid crystal layer 13 can form a pixel array. Besides, the display panel 1 can further include a plurality of scan lines SL and a plurality of data lines DL, and the scan lines SL and the data lines DL cross each other, perpendicularly for example, to define the region of the pixel array. The pixel array includes a plurality of pixels P which are disposed in a matrix.

In this embodiment, as shown in FIG. 1C, the CF array includes a color filter layer 113, which includes a plurality of color filter portions on the first substrate 11 to make a COA (color filter on array) substrate. However, in other embodiments, the color filter layer 13 can be disposed above the second substrate 12.

As shown in FIG. 1B, the pixel P can include a TFT T, a pixel electrode 14, a common electrode 15, a scan line SL and a data line DL. The TFT T, the pixel electrode 14, the common electrode 15, the scan line SL and the data line DL are disposed above the side of the first substrate facing the second substrate. Moreover, as shown in FIG. 1C, the pixel P can further include a protection layer (or called insulating layer) 111, a protection layer 112, a color filter layer 113, an insulating layer 114 and an alignment layer 115, which are disposed above the first substrate 11 from bottom to top. Besides, the pixel P of this embodiment can further include a light-blocking layer 121, a planarization layer 122, a transparent conductive layer 123, a spacer 124 and an alignment layer 125, which are disposed above the second substrate 12 from top to bottom. The structures of the TFT T and each layer in FIG. 1C are illustrated as below.

The TFT T includes a gate G, a protection layer 111, an active layer A, a source S, a drain D and a protection layer 112. The gate G is disposed above the first substrate 11 and can be a single-layer or multi-layer structure formed by metal (e.g. aluminum, copper, silver, molybdenum, or titanium) or alloy. A part of the wires, such as scan lines SL, for transmitting driving signals can be the same layer as the gate G and formed in the same process as the gate G, and they can be electrically connected to each other. The protection layer 111 is disposed above the gate G and cover the gate G. The protection layer 111 (or protection layer 112) can be a multi-layer structure formed by an organic material (such as organic silicon/oxide compound), an inorganic material (such as silicon nitride, silicon oxide, silicon oxynitride, silicon carbide, aluminum oxide, hafnium oxide), or their any combination. The protection layer 111 needs to completely cover the gate G and can partially or totally cover the first substrate 11.

Furthermore, the active layer A is disposed above the protection layer 111 and corresponding to the gate G. As an embodiment, the active layer A can include silicon semiconductor or oxide semiconductor for example. The above oxide semiconductor includes an oxide and the oxide include at least one of indium, zinc and tin. The source S and the drain D are disposed above the active layer A and contact the active layer A. When the active layer A of the TFT T is not enabled, the source S and the drain D are electrically separated from each other. The source S and the drain D can be a single-layer or multi-layer structure formed by metal (e.g. aluminum, copper, silver, molybdenum, or titanium) or alloy. Besides, A part of the wires, such as the data lines DL, for transmitting driving signals can be the same layer as the source S and drain D and formed in the same process as the source S and drain D. Moreover, the protection layer 112 is disposed above the drain D, the source S and the active layer A and overlaps the drain D and the source S.

The color filter layer 113 is disposed between the protection layer 112 and the insulating layer 114. The color filter layer 113 can include a red color filter portion, a green color filter portion and a blue color filter portion (not shown). In other embodiments, if the color filter layer 113 is disposed above the side of the second substrate 12 facing the first substrate 11, the color filter layer 113 can be replaced by a protection layer. The insulating layer 114 is disposed between the pixel electrode 14 and the color filter layer 113, and the pixel electrode 14 is partially disposed in a via V to contact and electrically connect to the drain D of the TFT T. The pixel electrode 14 is a pixel electrode and can include transparent conductive material, such as ITO, IZO, AZO, CTO, $SnO_2$ or ZnO. Besides, the alignment layer 115 is at least partially disposed in the via V and disposed above the insulating layer 114 and the pixel electrode 14. The material of the alignment layer 115 can include polyimide (PI) for example.

The light-blocking layer 121 is disposed above the second substrate 12 and corresponding to the TFT T. The light-blocking layer 121 is a black matrix layer and made by opaque material such as resin or metal (e.g. Cr, chromium oxide, or Cr-O-N compound). In this embodiment, the light-blocking layer 121 is disposed above the side of the second substrate 12 facing the first substrate 11 and over the TFT T along the third direction Z. Accordingly, the light-blocking layer 121 can cover the TFT T in a top view of the display panel 1. In other embodiments, however, the light-blocking layer 121 can be disposed above the first substrate 11 for making a BOA (BM on array) substrate. The planarization layer 122 is disposed above the light-blocking layer 121 and cover the light-blocking layer 121. The planarization layer 122 can include photoresist material, resin material or inorganic material (e.g. SiOx/SiNx) to protect the light-blocking layer 121 from being damaged by the subsequent processes. Furthermore, the transparent conductive layer 123 is disposed above and covers the planarization layer 122, and the spacer 124 is disposed above the second substrate 12 and the transparent conductive layer 123 and corresponding to the light-blocking layer 121. The spacer 124 can keep the interval between the first substrate 11 and the second substrate 12. In the third direction Z, the light-blocking layer 121 can cover the spacer 124. The alignment layer 125 is disposed above the spacer 124 and the transparent conductive layer 123, and can contact the alignment layer 115 or not. Besides, the display panel 1 can further include an adhesive 16. The adhesive 16 is disposed around the first substrate 11 and second substrate 12 to seal them to form an accommodating space, and therefore the liquid crystal layer 13 can be disposed in the accommodating space. The adhesive 16 can further prevent the moisture or external object from entering into the display panel 1 and damaging the inside elements.

When the scan signals transmitted by the scan lines SL of the display panel 1 enable the corresponding TFTs T, the data signals can be transmitted by the data lines DL to the corresponding pixel electrodes (pixel electrode 14) and the display panel 1 can display images thereby.

The pixel electrode 14 and the data line DL are disposed above the side of the first substrate 11 facing the second substrate 12, as shown in FIG. 1B, and the pixel electrode 14 is disposed within the two adjacent data lines DL and two adjacent scan lines SL (FIG. 1B just shows a single scan line SL). The pixel electrode 14 includes a first trunk electrode 141, a second trunk electrode 142 and a plurality of branch electrodes 143. The first trunk electrode 141 and the second trunk electrode 142 cross each other and their junction is approximately located at the central position of the pixel P, and four electrode regions are substantially formed thereby. The branch electrodes 143 in each of the electrode regions are disposed along a direction and separated from each other by a distance t. The first trunk electrode 141 extends along a first direction X (the extension thereof is not shown in FIG. 1B), and the extending direction thereof crosses the data line DL. The first direction X is substantially parallel to the extending direction of the scan line SL. The second trunk electrode 142 extends along another direction (the extension thereof is not shown in FIG. 1B) and is disposed between the data lines DL of the two adjacent pixels P. The branch electrodes 143 connect to the first trunk electrode 141 and the second trunk electrode 142. The included angle between the first trunk electrode 141 and the second trunk electrode 142 can be between 80° and 100°. In this embodiment, the above included angle is 90° for example, and the extension of the first trunk electrode 141 along the first direction X is perpendicular to the data line DL. The first trunk electrode 141 of this embodiment is substantially parallel to the scan line SL, and the second trunk electrode 142 is substantially parallel to the data line DL, but this invention is not limited thereto. Besides, the branch electrodes 143 extend along a second direction Y, and at least an angle y is formed by the second direction Y and the first direction X. The ppi value of the display panel 1 is x (a positive integer). The ppi value can be counted along the first direction X or the direction perpendicular to the first direction X. In this embodiment, the pixel is the pixel unit composed of three sub-pixels of RGB. However, the pixel also can be the pixel unit composed of four sub-pixels of RGBW in other embodiments. In another embodiment, the first trunk electrode 141 may overlap with the data line DL, and the second trunk electrode 142 may overlap with the scan line SL. In another embodiment, the branch electrodes 143 may overlap with at least one of the data line DL and the scan line SL.

When the resolution of the display panel 1 is higher (i.e. higher ppi value), the average azimuthal angle of the liquid crystal molecule will be affected by the electric field of the adjacent data lines DL, common electrode 15 and pixel electrode 14 and thus can't be kept at 45° anymore, and therefore the transmittance of the display panel 1 will be reduced. Here the so-called average azimuthal angle (ψ angle) of the liquid crystal molecules indicates the azimuthal angle of the liquid crystal in a top view of the display panel and also the acute angle between the director of the liquid crystal and the first direction X. As shown in the following table, different ppi values correspond to different pixel widths, and when the ppi value is higher, the average azimuthal angle of the liquid crystal of the display panel 1 will become less.

| ppi | 90 | 125 | 141 | 157 | 200 |
|---|---|---|---|---|---|
| Pixel width | 94 μm | 68 μm | 60 μm | 54 μm | 42 μm |
| ψ angle | 39.37 | 37.96 | 36.64 | 35.41 | 32.13 |

Figure 2:
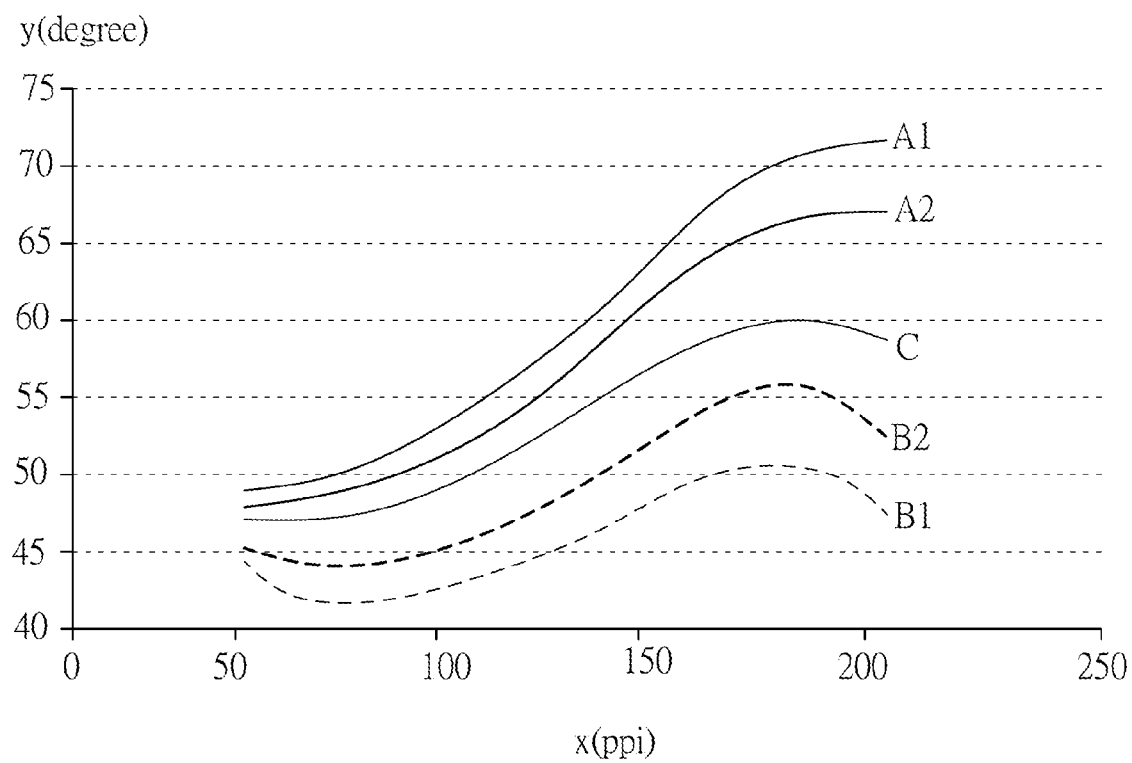
FIG. 2 is a schematic diagram showing the relation between the angle y formed by the branch electrodes and the first direction and the ppi value x of the display panel.

Therefore, refer to FIG. 2, which is a schematic diagram showing the relation between the angle y formed by the branch electrodes 143 (extending along the second direction Y) and the first direction X and the ppi value x of the pixel P of the display panel 1.

In this embodiment, y is between two curves A1 and B1 (B1<y<A1), and the equation of the curve A1 is $A1=-1.28\times10^{-5}(x)^3+0.0047722(x)^2-0.383068(x)+59.494865$, and the equation of the curve B1 is $B1=-2.38\times10^{-5}(x)^3+0.0093751(x)^2-1.098394(x)+81.919357$. If the angle y is between the curves A1 and B1, the difference between the original transmittance and the adjusted transmittance of the display panel 1 can be within 2%.

In other words, if y is between A1 and B1 and larger than 45° and less than or equal to 70° (45<y≤70), the display panel 1 can have a less transmittance loss. Therefore, in order to make the average azimuthal angle (ψ angle) of the liquid crystal molecules more approach 45°, the angle y formed between the branch electrodes 143 of the pixel electrode 14 and the first direction X is increased in this invention, and when y is between the curves A1 and B1, the influence caused by the electric field among the data lines DL, common electrode 15 and pixel electrode 14 can be reduced, and therefore the whole transmittance of the display panel 1 can be enhanced.

Favorably, y can be further between the curves A2 and B2 (B2<y<A2), the equation of the curve A2 is $A2=-1.44\times10^{-5}(x)^3+0.0054463(x)^2-0.487826(x)+62.778856$, and the equation of the curve B2 is $B2=-2.22\times10^{-5}(x)^3+0.008701(x)^2-0.993637(x)+78.635367$.

In other words, if y is between A2 and B2 and larger than 55° and less than or equal to 70° (55<y≤70), the display panel 1 can have a much less transmittance loss. If the angle y is between the curves A2 and B2, the difference between the original transmittance and the adjusted transmittance of the display panel 1 can be within 1%. To be noted, when y and x satisfy the equation as $y=-1.83\times10^{-5}x^3+0.007085x^2-0.742111x+70.75253$ (i.e. the curve C), the display panel 1 can have the best transmittance.

Herein an example is given by taking x=157 (i.e. 157 ppi). When y is larger than or equal to 45°, the corresponding average azimuthal angle of the liquid crystal molecules and transmittance gain are shown in the following table. To be noted, the transmittance gain (%) is obtained on the basis of y=45°.

| Angle y | 45 | 50 | 55 | 60 | 65 |
|---|---|---|---|---|---|
| Transmittance gain | 0% | 2.69% | 3.05% | 3.61% | 2.84% |
| ψ angle | 35.41 | 39.93 | 42.8 | 45.17 | 48.71 |

From the above table, when x=157 and the angle y is getting larger, the transmittance gain can be increased by about 2%~4%. Herein, when y is 60°, the highest gain can be obtained as 3.61%, and the corresponding average azimuthal angle (ψ) of liquid crystal is 45.17°, which is the closest to 45°. Meanwhile, the display panel 1 can have the best transmittance. When y approaches the curve C of FIG. 2 more, the transmittance gain will be higher.

Figure 3:
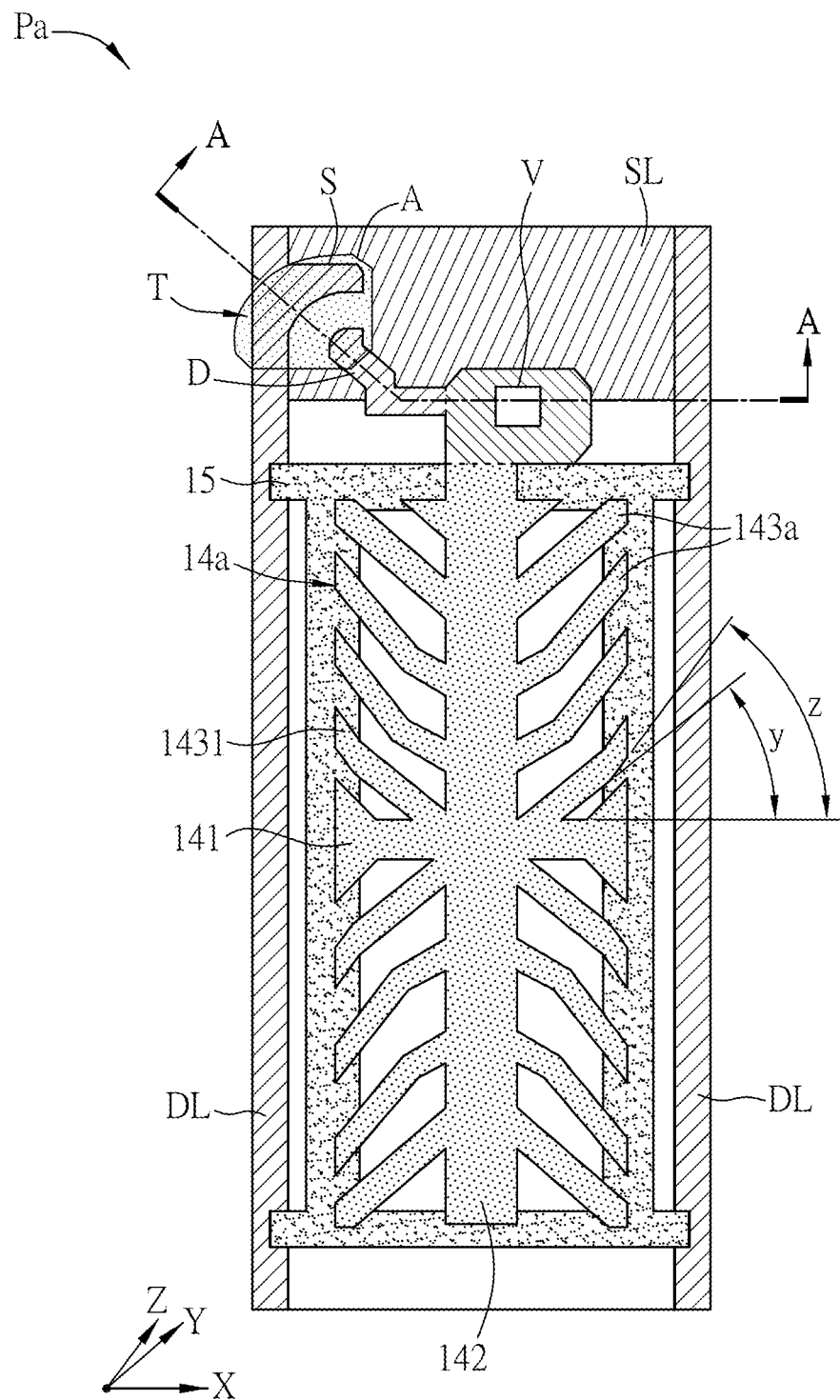
FIG. 3 is a schematic diagram of the pixel of another embodiment of the invention.

FIG. 3 is a schematic diagram of the pixel Pa of another embodiment of the invention.

As shown in FIG. 3, the main difference between the pixel Pa of this embodiment and the pixel P in FIG. 1B is that at least one of the branch electrodes 143a of the pixel electrode 14a of the pixel Pa has a bent portion 1431. Herein for example, a part of the branch electrodes 143a has the bent portion 1431 and the rest doesn't have the bent portion 1431. The bent portion 1431 is, for example but not limited to, a linear or curved bent portion. As shown in FIG. 3, when the bent portion 1431 is linear, the bent portion 1431 extends along a third direction Z, and an angle z is formed by the third direction Z and the first direction X. The angle z is larger than 45° and less than or equal to 70° (45<z≤70), and z is larger than y. Favorably, the angle z is larger than 55° and less than or equal to 70° (55<z≤70). Moreover, when the bent portion 1431 is curved (not shown), an angle z also can be formed between at least a tangent line of the curved bent portion 1431 and the first direction X. The angle z is larger than 45° and less than or equal to 70° (45<z≤70), and z is larger than y. Favorably, the angle z is larger than 55° and less than or equal to 70° (55<z≤70).

Other technical features of the pixel Pa can be comprehended by referring to the pixel P and therefore are not illustrated here for conciseness.

Summarily, in the display panel and display device of the invention, the pixel electrode of the display panel includes a first trunk electrode and a plurality of branch electrodes, the extension of the first trunk electrode along a first direction crosses the data line and the first trunk electrode connects to the branch electrodes. Besides, the branch electrodes extend along a second direction and at least an angle y is formed by the first direction and the second direction. The equations are satisfied as follows:

$$A1=-1.28\times10^{-5}(x)^3+0.0047722(x)^2-0.383068(x)+59.494865,$$

$$B1=-2.38\times10^{-5}(x)^3+0.0093751(x)^2-1.098394(x)^2-1.098394(x)+81.919357,$$

$$B1<y<A1,$$

$$45°<y\leq70°,$$

x is the value of the ppi of the display panel.

Thereby, in comparison with the conventional art, when the angle y formed between the branch electrodes of the pixel electrode of the display panel and device and the first direction is between the above curves A1 and B1, and y is larger than 45° and less than or equal to 70°, the azimuthal angle of the liquid crystal is affected by the electric field of the data lines, the common electrode and the transparent electrode so that the average azimuthal angle of the corresponding liquid crystal molecules can approach 45°. In combination with the angle design of the transmittance axis of the polarizer, the whole transmittance of the display panel and device can be increased, and therefore the power can be saved and the product competitiveness can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel, comprising:
   a first substrate;
   a second substrate; and
   a pixel array disposed between the first substrate and the second substrate and comprising:
   a pixel electrode;
   a data line disposed adjacent to the pixel electrode and disposed above a side of the first substrate facing the second substrate,
   wherein the pixel electrode comprises a first trunk electrode and a plurality of branch electrodes, an extension of the first trunk electrode along a first direction crosses the data line, the first trunk electrode connects to the branch electrodes, and the branch electrodes extend along a second direction, wherein an angle y is formed by the first direction and the second direction, x is the value of the ppi of the display panel, and x and y satisfy the following equations:

$A1 = -1.28 \times 10^{-5}(x)^3 + 0.0047722(x)^2 - 0.383068(x) + 59.494865$, $B1 = -2.38 \times 10^{-5}(x)^3 + 0.0093751(x)^2 - 1.098394(x)^2 - 1.098394(x) + 81.919357$, $B1 < y < A1$, $45° < y \leq 70°$.

2. The display panel as recited in claim 1, wherein y is further larger than 55° and less than or equal to 70°, $B2 < y < A2$, and the equation of A2 is $A2 = -1.44 \times 10^{-5}(x)^3 + 0.0054463(x)^2 - 0.487826(x) + 62.778856$, and the equation of B2 is $B2 = -2.22 \times 10^{-5}(x)^3 + 0.008701(x)^2 0.993637(x) + 78.635367$.

3. The display panel as recited in claim 1, wherein at least one of the branch electrodes has a bent portion extending along a third direction, an angle z is formed by the third direction and the first direction, and the angle z is larger than 45° and less than or equal to 70°.

4. The display panel as recited in claim 1, wherein at least one of the branch electrodes has a curved shape, an angle z is formed by at least a tangent line of the curved shape and the first direction, and the angle z is larger than 45° and less than or equal to 70°.

5. A display device, comprising:
   a display panel comprising a first substrate, a second substrate and a pixel array disposed between the first substrate and the second substrate and comprising a pixel electrode and a data line disposed adjacent to the pixel electrode and disposed above a side of the first substrate facing the second substrate,
   wherein the pixel electrode comprises a first trunk electrode and a plurality of branch electrodes, an extension of the first trunk electrode along a first direction crosses the data line, the first trunk electrode connects to the branch electrodes, and the branch electrodes extend along a second direction, wherein an angle y is formed by the first direction and the second direction, x is the value of the ppi of the display panel, and x and y satisfy the following equations:

$A1 = -1.28 \times 10^{-5}(x)^3 + 0.0047722(x)^2 - 0.383068(x) + 59.494865$, $B1 = -2.38 \times 10^{-5}(x)^3 + 0.0093751(x)^2 - 1.098394(x)^2 - 1.098394(x) + 81.919357$, $B1 < y < A1$, $45° < y \leq 70°$.

6. The display device as recited in claim 5, wherein y is further larger than 55° and less than or equal to 70°, $B2 < y < A2$, and the equation of A2 is $A2 = -1.44 \times 10^{-5}(x)^3 + 0.0054463(x)^2 - 0.487826(x) + 62.778856$, and the equation of B2 is $B2 = -2.22 \times 10^{-5}(x)^3 + 0.008701(x)^2 - 0.993637(x) + 78.635367$.

7. The display device as recited in claim 5, wherein at least one of the branch electrodes has a bent portion extending along a third direction, an angle z is formed by the third direction and the first direction, and the angle z is larger than 45° and less than or equal to 70°.

8. The display device as recited in claim 5, wherein at least one of the branch electrodes has a curved shape, an angle z is formed by at least a tangent line of the curved shape and the first direction, and the angle z is larger than 45° and less than or equal to 70°.

9. The display device as recited in claim 7, wherein z is larger than y, and the angle z is further larger than 55° and less than or equal to 70°.

* * * * *